(12) United States Patent
Uyyala et al.

(10) Patent No.: US 10,769,849 B2
(45) Date of Patent: Sep. 8, 2020

(54) USE OF TEMPORAL MOTION VECTORS FOR 3D RECONSTRUCTION

(71) Applicant: INTEL CORPORATION, Santa Clara, CA (US)

(72) Inventors: Sridhar Uyyala, Hillsboro, OR (US); Bradley A. Jackson, Hillsboro, OR (US); Ignacio J. Alvarez, Portland, OR (US); Deepak S. Vembar, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 42 days.

(21) Appl. No.: 15/772,740

(22) PCT Filed: Nov. 4, 2016

(86) PCT No.: PCT/US2016/060678
§ 371 (c)(1),
(2) Date: May 1, 2018

(87) PCT Pub. No.: WO2017/079657
PCT Pub. Date: May 11, 2017

(65) Prior Publication Data
US 2019/0213789 A1    Jul. 11, 2019

Related U.S. Application Data

(60) Provisional application No. 62/250,827, filed on Nov. 4, 2015.

(51) Int. Cl.
*G06T 17/20* (2006.01)
*G06T 17/00* (2006.01)
(Continued)

(52) U.S. Cl.
CPC ............ *G06T 17/205* (2013.01); *G06T 7/215* (2017.01); *G06T 7/292* (2017.01); *G06T 7/55* (2017.01);
(Continued)

(58) Field of Classification Search
CPC ..... G06T 17/205; G06T 17/005; G06T 15/08; G06T 15/005; G06T 7/55; G06T 7/215; G06T 7/292
See application file for complete search history.

(56) References Cited

U.S. PATENT DOCUMENTS 5,729,471 A * 3/1998 Jain ...................... H04N 13/139
725/131
5,850,352 A * 12/1998 Moezzi ................ H04N 13/139
345/419

(Continued)

FOREIGN PATENT DOCUMENTS

WO    2017/079657 A1    5/2017

OTHER PUBLICATIONS

Laine, Samuli, and Tero Karras. "Efficient sparse voxel octrees—analysis, extensions, and implementation." NVIDIA Corporation 2 (2010). (Year: 2010).*

(Continued)

*Primary Examiner* — King Y Poon
*Assistant Examiner* — Vincent Peren
(74) *Attorney, Agent, or Firm* — Finch & Maloney PLLC (57) ABSTRACT

Techniques for three-dimensional (3D) reconstruction of a dynamic scene as a set of voxels are provided. One technique includes: receiving, by a processor, image data from each of two or more spatially-separated sensors observing the scene from a corresponding two or more vantage points; fusing, by the processor, the image data into the set of voxels on a frame-by-frame basis; segmenting, by the processor, the (Continued)

image data into objects that constitute the scene; detecting, by the processor, which of the objects remain static from frame to frame, remaining ones of the objects being dynamic; filtering, by the processor, the set of voxels to remove those of the voxels corresponding to the static objects, to produce a dynamic subset of the voxels; and outputting, by the processor to a display device, those of the voxels corresponding to the dynamic objects (such as the dynamic subset) and not to the static objects.

18 Claims, 4 Drawing Sheets

(51) Int. Cl.
    *G06T 7/215*     (2017.01)
    *G06T 7/55*     (2017.01)
    *G06T 7/292*     (2017.01)
    *G06T 15/00*     (2011.01)
    *G06T 15/08*     (2011.01)

(52) U.S. Cl.
    CPC ............ *G06T 15/005* (2013.01); *G06T 15/08* (2013.01); *G06T 17/005* (2013.01); *G06T 2207/20072* (2013.01); *G06T 2207/20081* (2013.01); *G06T 2210/08* (2013.01)

(56) References Cited

U.S. PATENT DOCUMENTS

| | | | | |
|---|---|---|---|---|
| 6,373,487 | B1 * | 4/2002 | Culbertson | G06T 17/00 345/424 |
| 6,731,799 | B1 | 5/2004 | Sun et al. | |
| 2005/0088515 | A1 * | 4/2005 | Geng | G06T 7/564 348/47 |
| 2009/0167843 | A1 | 7/2009 | Izzat et al. | |
| 2013/0272609 | A1 * | 10/2013 | Sun | H04N 5/23212 382/173 |
| 2014/0112547 | A1 | 4/2014 | Peeper et al. | |
| 2014/0303480 | A1 * | 10/2014 | Lai | A61B 5/7214 600/410 |
| 2015/0022521 | A1 | 1/2015 | Loop | |
| 2015/0279118 | A1 * | 10/2015 | Dou | G06T 15/04 345/427 |

OTHER PUBLICATIONS

International Search Report and Written Opinion received for PCT/US2016/060678, dated Feb. 28, 2017. 12 pages.
International Preliminary Report on Patentability received for PCT/US2016/060678, dated May 8, 2018. 9 pages.

* cited by examiner

USE OF TEMPORAL MOTION VECTORS FOR 3D RECONSTRUCTION

CROSS-REFERENCE TO RELATED APPLICATIONS

This application claims the benefit of U.S. Provisional Application No. 62/250,827, filed on Nov. 4, 2015, the entire content of which is herein incorporated by reference.

BACKGROUND

With the advent of virtual or augmented reality technologies (e.g., real-time immersive virtual reality or teleportation), there is a large demand for three-dimensional (3D) content creation and streaming to users to enable immersive experiences. Providing immersive experiences for live sporting events or performances may entail capturing large dynamic scenes and constructing 3D representations of the captured spaces for broadcast or streaming. 3D representation or rendering of such large dynamic scenes may be quite expensive in terms of computing, network, and display resources.

DETAILED DESCRIPTION

Further to the issues discussed above, in some possible techniques for addressing these concerns, some of the computing tasks can be offloaded to cloud computing resources. Such resources may provide for free viewpoint or interactive experiences, but require full geometry of the scene to be streamed and rendered on a client device (display client) using a voxel representation. This significantly increases computing at the display client. In other possible techniques, sparse voxel octree (SVO) representations can be used to limit the computational cost during rendering. For example, only pixels to be displayed are computed. This limits the amount of 3D voxel data (and thus, storage space) required for realistic, high-resolution digital models or environments. However, this type of optimization is primarily geared towards static scenes, and does not optimize well for real-time large dynamic scenes such as sports broadcasts.

Thus, techniques for efficiently 3D rendering dynamic scenes are disclosed. According to some embodiments of the present disclosure, the techniques include reconstructing and streaming sparse voxels for dynamic scenes. These embodiments reduce data bandwidth requirements and reduce display resource utilization for displaying dynamic scenes compared to other possible techniques, such as those discussed above. According to some such embodiments, the temporal motion of objects in dynamic scenes is learned such that only the part of the sparse voxel representation that undergoes changes in time is reconstructed or streamed. This reduces the data bandwidth requirement. Further, only having to render part of the scene reduces display resource utilization. This provides for improved user experiences in applications such as real-time immersive virtual reality or teleportation, including 3D broadcasts of live events like sportscasts.

According to some embodiments, the disclosed techniques are implemented on a computing system or a graphics processing system, or a software product executable or otherwise controllable by such systems. The system or product is configured to receive image/depth data from multiple cameras, fuse the multi-sensor data into 3D voxel data, identify the sparse subset of voxel data observable from the viewer's perspective, and broadcast or otherwise stream this sparse subset of voxel data to a display device of the user. In some such embodiments, some or all of the image processing takes place using cloud computing resources.

Figure 1:
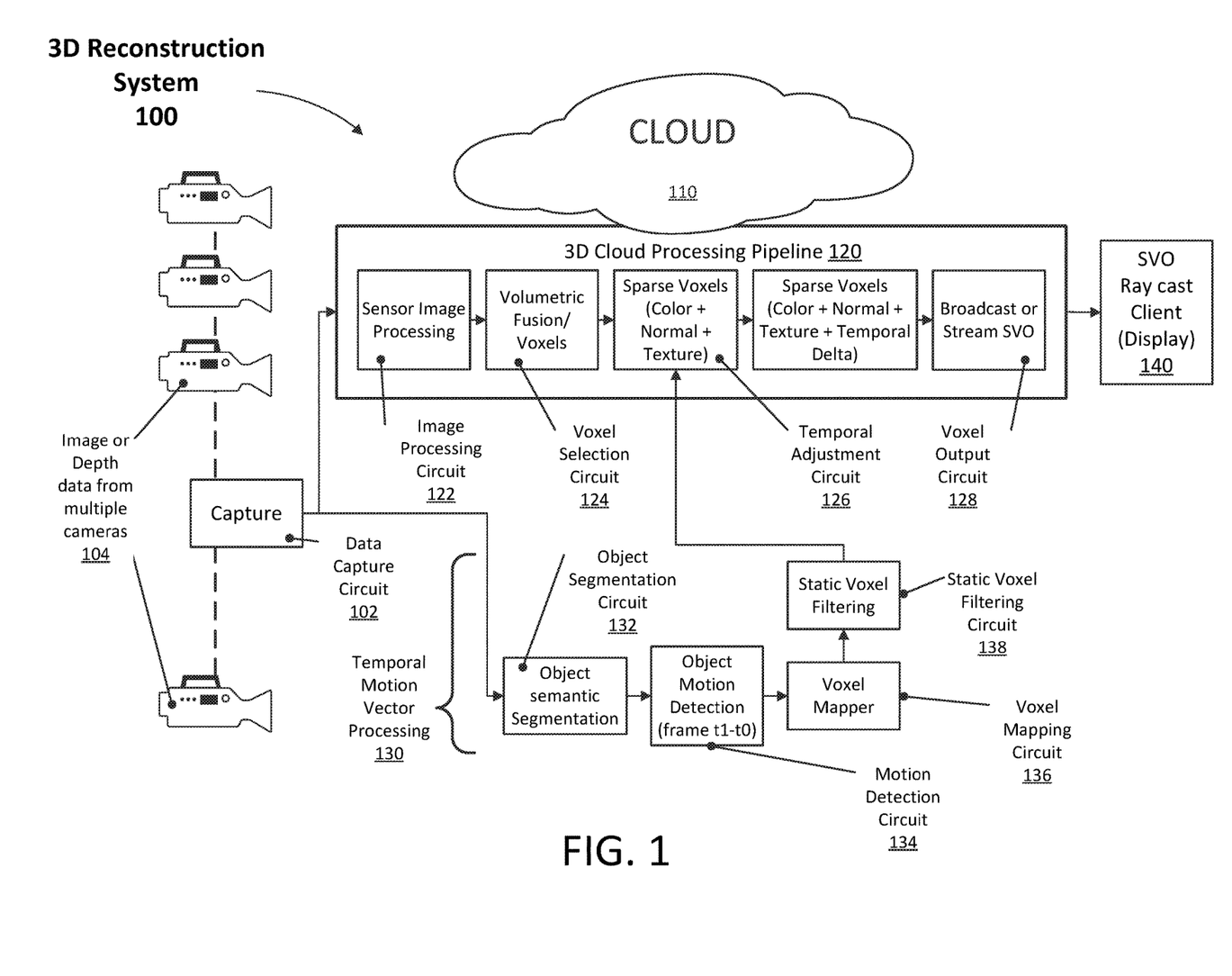
FIG. 1 illustrates an example computing system (including cloud computing component) configured to use temporal motion vectors for 3D reconstruction of sparse voxels for displaying of dynamic scenes, according to an embodiment of the present disclosure.

FIG. 1 illustrates an example computing system 100 (including cloud computing component 110) configured to use temporal motion vectors for 3D reconstruction of sparse voxels for displaying of dynamic scenes, according to an embodiment of the present disclosure. The 3D reconstruction system 100 includes a data capture circuit 102 configured to capture image or depth data from multiple cameras 104 or other image sensors. The cloud computing component 110 includes a 3D processing pipeline circuit 120. The 3D processing pipeline circuit 120 includes an image processing circuit 122, a voxel selection circuit 124, a temporal adjustment circuit 126, and a voxel output circuit 128.

The 3D reconstruction system 100 further includes a temporal motion vector circuit 130 to determine those objects in the scene undergoing change (e.g., movement) and those objects that are not changing (e.g., static). In addition, the 3D reconstruction system 100 includes a display device (or display client) 140 for presentation of the processed image data to a user. For example, the display device may be a 3D display device or a 2D display device configured to display the 3D scene from a desired or particular perspective. While the 3D reconstruction system 100 of FIG. 1 is described as a collection of distinct circuits and devices, the present disclosure is not limited thereto, and in other embodiments, some of the circuits or their functions may be combined or split among still further circuits.

The image processing circuit 122 processes the image or depth data from the multiple cameras 104 as assembled and output by the data capture circuit 102. For example, in some embodiments, the image processing circuit 122 orders the image data samples by time (e.g., in frames) and fuses (e.g., by volumetric fusion) the image data from the different sensors into corresponding voxel (3D) data. The voxel selection circuit 124 reduces the voxel data into a sparse data set, such as those voxels viewable to the user from the user's perspective, including such fields as color, normal, and texture. This data set may be, for example, a sparse voxel octree (SVO) data set. The temporal adjustment circuit 126 further processes the sparse voxel data set, removing those entries associated with stationary (e.g., nonchanging) objects. To this end, the temporal adjustment circuit 126 uses output data from the temporal motion vector circuit 130 (e.g., identification of static voxels) to produce a sparse set of changed voxels (or temporal delta from the previous set of voxel data output). The voxel output circuit 128 broadcasts or otherwise streams this processed sparse subset (or dynamic sparse subset) of voxel data to a display device 140 of the user, such as an SVO ray cast display device or display client, for presentation to the user. In some embodiments, the display client 140 interprets the dynamic sparse subset to be the only voxels capable of changing from the previous frame; all other voxels being either not currently viewable or associated with static objects (and thus rendered the same as in the previous frame).

According to an embodiment, the sparse voxels are generated in pipeline fashion after volumetric fusion of the scenes from multiple sensor imagery. By way of example, the image processing circuit 122, the voxel selection circuit 124, the temporal adjustment circuit 126, and the voxel output circuit 128 may each process in parallel on a different subset of the image data received from the cameras 104. According to some embodiments, the voxel selection circuit 124 reduces the potentially huge amount of storage space needed to store all of the voxel data by using an SVO implementation to store the 3D data, but only storing voxel data that contributes to the final observable image to the user (for example, not storing voxel data for inner voxels or occluded voxels). In addition, unlike other possible techniques, according to some embodiments, this voxel selection undergoes further reduction (e.g., in the temporal adjustment circuit 126) for dynamic scenes by not including voxel data for static elements of the scene. Other possible techniques, by contrast, process dynamic scenes by processing and generating voxel data for all scene geometry (dynamic and static) each frame.

According to some embodiments of the present disclosure, temporal motion of objects in dynamic scenes is accounted for, and only those voxels undergoing change are reconstructed or streamed as part of the output sparse voxel representation. This reduces the data bandwidth needed to process the 3D data and reduces display resources needed to display the data. In an embodiment, the SVO tree is reconstructed by learning which objects (and their corresponding voxels) change temporally in the scene and filtering out those voxels that are part of static objects. This reduces the scene geometry size to be streamed between frames, thus reducing or optimizing the bandwidth needed for real-time broadcast 3D data formats of dynamic scenes such as sportscasts. According to some such embodiments, the display client renders the voxels corresponding to the static objects the same as it did in the previous frame.

With further reference to FIG. 1, according to some embodiments, Sparse Voxel Octree (SVO) representations of the display of 3D dynamic scenes are made temporally efficient by using a temporal motion vector circuit 130 to learn objects in the dynamic scene that are changing temporally and to reconstruct only the voxels that change with each frame. This is as opposed to reconstructing the entire scene or portions of the dynamic scene that are static from frame to frame, as performed by other possible techniques.

To identify objects' motion over time, in some embodiments, object segmentation is used on captured images. For example, in one embodiment, an object segmentation circuit 132 learns the objects and their segmentation or separation using existing machine learning algorithms. Further, in some embodiments, a motion detection circuit 134 identifies those objects that change between frames. A voxel mapping circuit 136 maps objects to voxels of the volumetric scene representation of the 3D image data. A static voxel filtering circuit 138 identifies and, possibly in conjunction with the temporal adjustment circuit 126, filters out the static voxels from the 3D pipeline. This results in an SVO that is further tuned with temporal voxel information, which dramatically reduces the size of the output voxel data for network streaming.

The embodiments described herein provide for improved 3D reconstruction of dynamic scenes by using temporal motion vectors. The disclosed embodiments may be implemented on a broad range of computing and communication platforms, including mobile devices, since the disclosed techniques are computationally efficient. These embodiments may further be implemented in hardware or software or a combination thereof.

With further reference to FIG. 1, in embodiments of the present disclosure, the cameras 104 may be any sensor (e.g., 2D, 3D, infrared, radar) capable of providing image data. The cameras 104 are spatially separated. For example, in one embodiment, the cameras 104 are positioned about a scene at regular (or roughly regular) intervals (or vantage points) to provide 3D coverage of the scene through their overlapping coverage areas. This coverage is sufficient to permit 3D reconstruction of the scene from any viewing point.

The cameras 104 provide time-based samples of their field of view to the data capture circuit 102. The data capture circuit 102 collects these image data samples and provides them (e.g., in time order) to the 3D processing pipeline circuit 120. In addition, the image data is provided to the temporal motion vector circuit 130 to perform the temporal motion processing. In one embodiment, as illustrated in FIG. 1, the temporal motion processing includes the object segmentation circuit 132, which receives the image data from the data capture circuit 102 and performs object semantic segmentation on the image data. Here, the image data is segmented into objects. With object segmentation, the motion detection circuit 134 may track motion (and other visual change) of these objects temporally between frames. The voxel mapping circuit 136 maps the volumetric representation of each object to corresponding voxels, each object having its own volumetric voxel representation. This helps to keep track of temporal information specific to each object.

In an embodiment, the static voxel filtering circuit 138 determines, for each object, if there is no visually-impacting change detected in the object temporally. If so, the object's voxels are updated (or marked, such as in a temporal delta field) as inactive. Likewise, voxels of objects that have changed are marked active by the static voxel filtering circuit 138. In an embodiment, the voxel mapping circuit 136 maps all of the voxels for each object in an entire 3D scene. In some embodiments, the temporal adjustment circuit 126 filters out voxels from the full scene volumetric fusion that have been marked as inactive by the static voxel filtering circuit 138, which reduces the SVO size dramatically. This helps to reduce the network bandwidth required for dynamic scenes as only temporally optimized SVOs are streamed to the display device 140.

Figure 2:
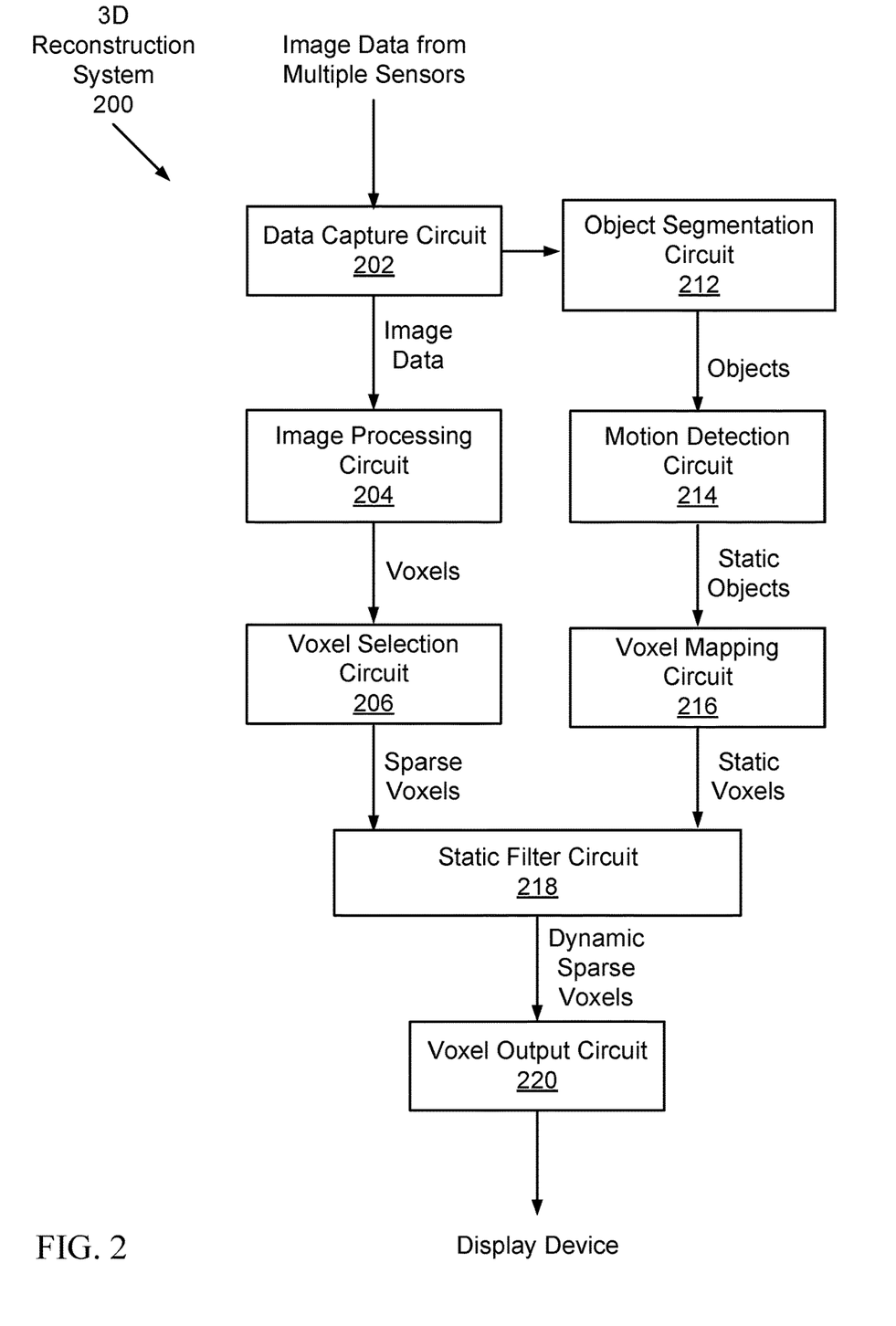
FIG. 2 is a block diagram of an example 3D reconstruction system, according to another embodiment of the present disclosure.

FIG. 2 is a block diagram of an example 3D reconstruction system 200, according to another embodiment of the present disclosure. The 3D reconstruction system 200 reconstructs a dynamic scene as a set of voxels and includes a data capture circuit 202, an image processing circuit 204, a voxel selection circuit 206, an object segmentation circuit 212, a motion detection circuit 214, a voxel mapping circuit 216, a static filter circuit 218, and a voxel output circuit 220. This embodiment is like the embodiment shown in FIG. 1 in that it includes parallel processing as shown. Thus, the previous relevant discussion is equally applicable here, however, in the embodiment of FIG. 2, note that the temporal adjustment circuit 126 of FIG. 1 has been integrated into the static filter circuit 218.

The data capture circuit 202 is configured to receive image data from each of two or more spatially-separated sensors observing the scene from a corresponding two or more vantage points. The sensors may be cameras or other visual sensing devices. The sensors are spatially separated (from different vantage points) in a sense that they are sufficiently far apart to permit 3D reconstruction of the scene by combining (or fusing) their corresponding image signals. For example, the sensors may surround or encompass the scene, and may be equidistant (or roughly equidistant) from their nearest neighboring sensors. The image processing circuit 204 is configured to fuse the image data from the different sensors into the set of voxels (3D representation) on a frame-by-frame basis. This may be accomplished, for example, by volumetric fusion or other techniques of fusing overlapping 2D image data into 3D data. The voxel selection circuit 206 is configured to select only those voxels currently visible to a user of the display device, to produce a sparse subset of the voxels, such as a sparse voxel octree (SVO) representation of the voxels.

The object segmentation circuit 212 is configured to segment the image data into objects that constitute the scene (e.g., by using machine learning algorithms). The motion detection circuit 214 is configured to detect which of the objects remain static (e.g., do not change) from frame to frame. The remaining objects in the scene are dynamic (e.g., moving or otherwise changing). The voxel mapping circuit 216 is configured to map the static objects to their corresponding voxels. The static filter circuit 218 is configured to filter the sparse subset to remove those voxels corresponding to the static objects, to produce a dynamic subset of the sparse subset (e.g., a dynamic sparse subset of the voxels). The voxel output circuit 220 is configured to output (to a display device) those voxels corresponding to the dynamic objects and not to the static objects. The voxel output circuit 220 is further configured to only output those of the voxels belonging to the dynamic sparse subset. In some embodiments, the display device is configured to receive the voxels corresponding to the dynamic objects, render the received voxels corresponding to the dynamic objects, and render voxels corresponding to the static objects received during earlier frames.

Methodology

Figure 3:
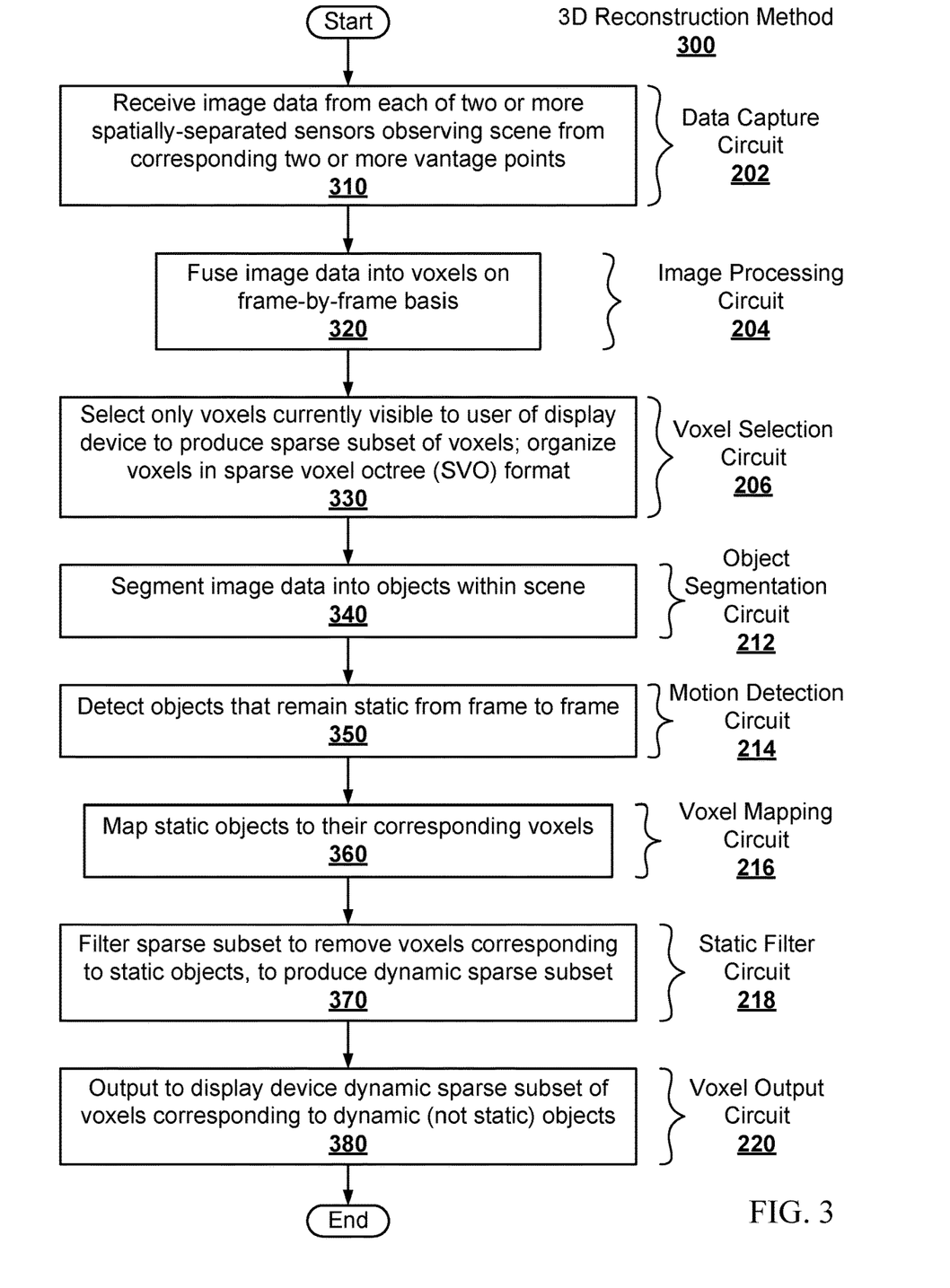
FIG. 3 is a flowchart illustrating an example method for 3D reconstruction, according to an embodiment of the present disclosure.

FIG. 3 is a flowchart illustrating an example method 300 for 3D reconstruction of a dynamic scene as a set of voxels, according to an embodiment of the present disclosure. As may be seen, example method 300 includes several phases and sub-processes, the sequence of which may vary from one embodiment to another. However, when considered in the aggregate, these phases and sub-processes form a process for 3D reconstruction in accordance with some of the embodiments disclosed herein. These embodiments may be implemented, for example, using one of the system architectures illustrated in FIG. 1 and FIG. 2 as described above.

However, other system architectures may be used in other embodiments, as will be apparent in light of this disclosure. To this end, the correlation of the various functions shown in FIG. 3 to the specific components illustrated in the other figures is not intended to imply any structural or use limitations. Rather, other embodiments may include, for example, varying degrees of integration where multiple functionalities are effectively performed by one system. For example, in an alternative embodiment, a single module may be used to perform all the functions of method 300. Thus, other embodiments may have fewer or more modules or sub-modules depending on the granularity of implementation. In still other embodiments, the methodology depicted may be implemented as a computer program product including one or more non-transitory machine readable mediums that when executed by one or more processors cause the methodology to be carried out. Numerous variations and alternative configurations will be apparent in light of this disclosure.

As illustrated in FIG. 3, in one embodiment, method 300 for 3D reconstruction commences by receiving, at operation 310, image data from each of two or more spatially-separated sensors observing the scene from a corresponding two or more vantage points. This may be performed, for example, by the data capture circuit 202 of FIG. 2. At operation 320, the image data is fused into the set of voxels on a frame-by-frame basis. This may be performed, for example, by the image processing circuit 204 of FIG. 2. At operation 330, only those voxels currently visible to a user of the display device are selected to produce a sparse subset of the voxels. These voxels may be organized, for example, in a sparse voxel octree (SVO) format. This operation may be performed, for example, by the voxel selection circuit 206 of FIG. 2.

At operation 340, the image data is segmented into objects that constitute the scene. This may be performed, for example, by the object segmentation circuit 212 of FIG. 2. At operation 350, the objects that remain static from frame to frame are detected. The remaining objects are dynamic (e.g., move or otherwise change between frames). This may be performed, for example, by the motion detection circuit 214 of FIG. 2. At operation 360, the static objects are mapped to their corresponding voxels. This may be performed, for example, by the voxel mapping circuit 216 of FIG. 2. At step 370, the sparse subset is filtered to remove those voxels corresponding to the static objects, to produce a dynamic subset of the sparse subset. This may be performed, for example, by the static filter circuit 218 of FIG. 2. At step 380, those voxels corresponding to the dynamic objects (and not to the static objects) are output to a display device (such as a 3D display device or an SVO ray cast display device). This may entail only outputting those voxels belonging to the dynamic sparse subset of voxels. This may be performed, for example, by the voxel output circuit 220 of FIG. 2.

In some embodiments, the method further includes receiving, by the display device, the voxels corresponding to the dynamic objects; rendering, by the display device, the received voxels corresponding to the dynamic objects; and rendering, by the display device, voxels corresponding to the static objects received during earlier frames. In some embodiments, additional operations may be performed, as previously described in connection with the system.

Example System

Figure 4:
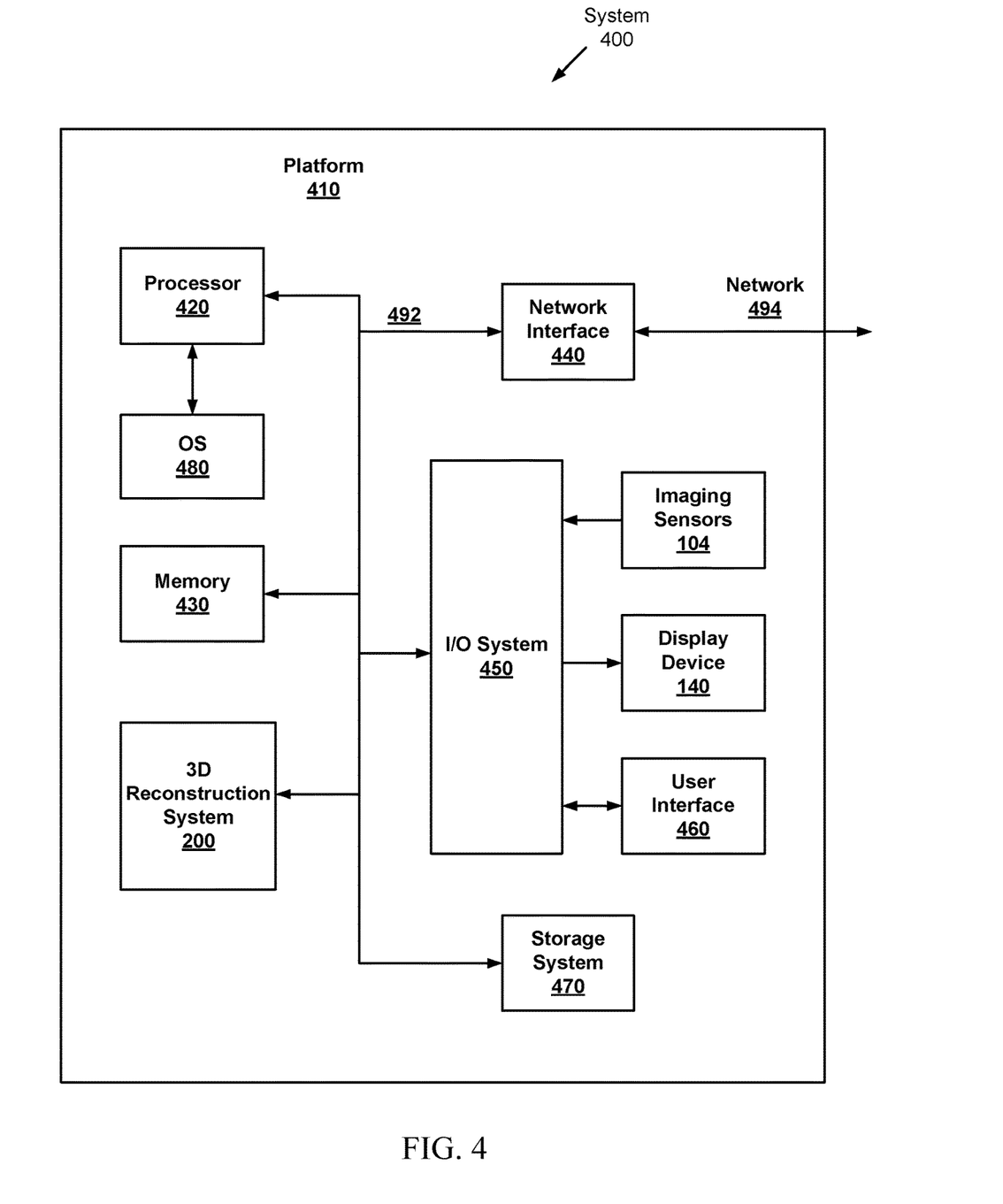
FIG. 4 illustrates an example system platform to perform 3D reconstruction, according to an embodiment of the present disclosure.

FIG. 4 illustrates an example system 400 to perform 3D reconstruction, according to an embodiment of the present disclosure. In some embodiments, system 400 includes a platform 410 that may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, television (TV), smart TV, TV receiver/converter or set top box, and so forth. Any combination of different devices may be used in some embodiments.

In some embodiments, platform 410 may include any combination of a processor 420, memory 430, 3D reconstruction system 200, network interface 440, input/output (I/O) system 450, imaging sensors 104, display device 140, user interface 460, and storage system 470. As may be further seen, a bus or interconnect 492 is also provided to allow for communication between the various components listed above or other components not shown. Platform 410 may be coupled to a network 494 through network interface 440 to allow for communications with other computing devices, platforms, or resources. Other componentry and functionality not reflected in the block diagram of FIG. 4 will be apparent in light of this disclosure, and it will be appreciated that other embodiments are not limited to any particular hardware configuration.

Processor 420 may be any suitable processor, and may include one or more coprocessors or controllers, such as an audio processor or a graphics processing unit, to assist in control and processing operations associated with system 400. In some embodiments, the processor 420 may be implemented as any number of processor cores. The processor (or processor cores) may be any type of processor, such as, for example, a micro-processor, an embedded processor, a digital signal processor (DSP), a graphics processor (GPU), a network processor, a field programmable gate array, or other device configured to execute code. The processors may be multithreaded cores in that they may include more than one hardware thread context (or "logical processor") per core. Processor 420 may be implemented as a complex instruction set computer (CISC) or a reduced instruction set computer (RISC) processor. In some embodiments, processor 420 may be configured as an x86 instruction set compatible processor.

In some embodiments, the disclosed techniques for 3D reconstruction may be implemented in a parallel fashion, where tasks may be distributed across multiple CPU/GPU cores or other cloud based resources to enable real-time processing from image capture to display.

Memory 430 may be implemented using any suitable type of digital storage including, for example, flash memory or random access memory (RAM). In some embodiments, the memory 430 may include various layers of memory hierarchy or memory caches. Memory 430 may be implemented as a volatile memory device such as, but not limited to, a RAM, dynamic RAM (DRAM), or static RAM (SRAM) device. Storage system 470 may be implemented as a non-volatile storage device such as, but not limited to, one or more of a hard disk drive (HDD), a solid state drive (SSD), a universal serial bus (USB) drive, an optical disk drive, a tape drive, an internal storage device, an attached storage device, flash memory, battery backed-up synchronous DRAM (SDRAM), and a network accessible storage device. In some embodiments, storage 470 may include technology to increase the storage performance enhanced protection for valuable digital media when multiple hard drives are included.

Processor 420 may be configured to execute an Operating System (OS) 480 that may include any suitable operating system, such as Google Android (Google Inc., Mountain View, Calif.), Microsoft Windows (Microsoft Corp., Redmond, Wash.), Apple OS X (Apple Inc., Cupertino, Calif.), or Linux. As will be appreciated in light of this disclosure, the techniques provided herein may be implemented without regard to the particular operating system provided in conjunction with system 400, and therefore may also be implemented using any suitable existing or subsequently-developed platform.

Network interface circuit 440 may be any appropriate network chip or chipset which allows for wired or wireless connection between other components of computer system 400 or network 494, thereby enabling system 400 to communicate with other local or remote computing systems, servers, and cloud-based servers or resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, or Near Field Communication (NFC). Example wireless networks include, but are not limited to, wireless local area networks, wireless personal area networks, wireless metropolitan area networks, cellular networks, and satellite networks.

I/O system 450 may be configured to interface between various I/O devices and other components of computer system 400. I/O devices may include, but not be limited to, imaging sensors 104, display device 140, user interface 460, and other devices not shown such as a keyboard, mouse, microphone, and speaker, etc.

It will be appreciated that in some embodiments, the various components of the system 400 may be combined or integrated in a system-on-a-chip (SoC) architecture. In some embodiments, the components may be hardware components, firmware components, software components, or any suitable combination of hardware, firmware, or software.

3D reconstruction system 200 is configured to provide three-dimensional (3D) reconstruction of a dynamic scene as a set of voxels. These techniques include receiving image data from each of two or more spatially-separated sensors observing the scene from a corresponding two or more vantage points and fusing the image data into the set of voxels on a frame-by-frame basis. These techniques further include segmenting the image data into objects that constitute the scene and detecting which of the objects remain static from frame to frame, the remaining objects being dynamic. Further, these techniques include outputting those voxels corresponding to the dynamic objects and not to the static objects. 3D reconstruction system 200 may include any or all of the components illustrated in FIGS. 1-3, as described above.

3D reconstruction system 200 may be implemented or otherwise used in conjunction with a variety of suitable software or hardware that is coupled to or that otherwise forms a part of platform 410. 3D reconstruction system 200 may additionally or alternatively be implemented or otherwise used in conjunction with user I/O devices that may provide information to, and receiving information and commands from, a user. These I/O devices may include devices collectively referred to as user interface 460. In some embodiments, user interface 460 may include a textual input device such as a keyboard, and a pointer-based input device such as a mouse. Other input/output devices that may be used in other embodiments include a touchscreen, a touchpad, a microphone, and a speaker. Still other input/output devices may be used in other embodiments. Further examples of user input may include gesture or motion recognition and facial tracking.

In some embodiments, 3D reconstruction system 200 may be installed local to system 400, as shown in the example embodiment of FIG. 4. In other embodiments, system 400 may be implemented in a client-server arrangement where at least some functionality associated with these circuits is provided to system 400 using an applet, such as a JavaScript applet, or another downloadable module. Such a remotely accessible module or sub-module may be provisioned in real-time, in response to a request from a client computing system for access to a given server having resources that are of interest to the user of the client computing system. In such embodiments, the server may be local to network 494 or remotely coupled to network 494 by one or more other networks or communication channels. In some cases, access to resources on a given network or computing system may require credentials such as usernames, passwords, or compliance with any other suitable security mechanism.

In various embodiments, system 400 may be implemented as a wireless system, a wired system, or a combination of both. When implemented as a wireless system, system 400 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 400 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" or "coupled" to indicate that two or more elements are in direct physical or electrical contact with each other. The term "coupled," however, may also mean that two or more elements are not in direct contact with each other, yet still cooperate or interact with each other.

The various embodiments disclosed herein may be implemented in various forms of hardware, software, firmware, or special purpose processors. For example, in one embodiment at least one non-transitory computer readable storage medium has instructions encoded thereon that, when executed by one or more processors, cause one or more of the 3D reconstruction methodologies disclosed herein to be implemented. The instructions may be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions may be provided in the form of one or more computer software applications or applets that are tangibly embodied on a memory device, and that may be executed by a computer having any suitable architecture.

In one embodiment, the system may be hosted on a given website and implemented, for example, using JavaScript or another suitable browser-based technology. For instance, in some embodiments, the system may leverage processing resources provided by a remote computer system accessible via network 494. In other embodiments, the functionalities disclosed herein may be incorporated into other software applications, such as virtual reality applications, gaming applications, entertainment applications, or other video processing applications.

The computer software applications disclosed herein may include any number of different modules, sub-modules, or other components of distinct functionality, and may provide information to, or receive information from, still other components. These modules may be used, for example, to communicate with input or output devices such as a display screen, a touch sensitive surface, a printer, or any other suitable device. Other componentry and functionality not reflected in the illustrations will be apparent in light of this disclosure, and it will be appreciated that other embodiments are not limited to any particular hardware or software configuration. Thus, in other embodiments, system 400 may include additional, fewer, or alternative subcomponents as compared to those included in the embodiment of FIG. 4.

The non-transitory computer readable medium may be any suitable medium for storing digital information, such as a hard drive, a server, a flash memory, or random access memory (RAM), or a combination of memories. In alternative embodiments, the components or modules disclosed herein may be implemented with hardware, including gate level logic such as a field-programmable gate array (FPGA), or alternatively, a purpose-built semiconductor such as an application-specific integrated circuit (ASIC). Still other embodiments may be implemented with a microcontroller having one or more input/output ports for receiving and outputting data, and one or more embedded routines for carrying out the various functionalities disclosed herein. It will be apparent that any suitable combination of hardware, software, and firmware may be used, and that other embodiments are not limited to any particular system architecture.

Some embodiments may be implemented, for example, using a machine readable medium or article which may store an instruction or a set of instructions that, if executed by a machine, may cause the machine to perform a method or operations in accordance with the embodiments. Such a machine may include, for example, any suitable processing platform, computing platform, computing device, processing device, computing system, processing system, computer, process, or the like, and may be implemented using any suitable combination of hardware and software. The machine readable medium or article may include, for example, any suitable type of memory unit, memory device, memory article, memory medium, storage device, storage article, storage medium, or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, or interpreted programming language.

Unless specifically stated otherwise, it may be appreciated that terms such as "processing," "computing," "calculating," "determining," or the like refer to the action or process of a computer or computing system, or similar electronic computing device, that manipulates or transforms data represented as physical quantities (for example, electronic) within the registers or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may include, for example, singly or in any combination, hardwired circuitry, programmable circuitry such as computer processors including one or more individual instruction processing cores, state machine circuitry, or firmware that stores instructions executed by programmable circuitry. The circuitry may include a processor or controller configured to execute one or more instructions to perform one or more operations described herein. The instructions may be embodied as, for example, an application, software, firmware, etc., configured to cause the circuitry to perform any of the operations. Software may be embodied as a software package, code, instructions, instruction sets, or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets, or data that are hard-coded (e.g., nonvolatile) in memory devices.

The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood in light of the present disclosure, however, that the embodiments may be practiced without these specific details. In other instances, well known operations, components, and circuits have not been described in detail so as not to obscure the embodiments. It may be appreciated that the specific structural and functional details disclosed herein may be representative and do not necessarily limit the scope of the embodiments. In addition, although the subject matter has been described in language specific to structural features or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for three-dimensional (3D) reconstruction of a dynamic scene as a set of voxels. The method includes: receiving, by the processor, image data from each of two or more spatially-separated sensors observing the scene from a corresponding two or more vantage points; fusing, by the processor, the image data into the set of voxels on a frame-by-frame basis; segmenting, by the processor, the image data into objects that constitute the scene; detecting, by the processor, which of the objects remain static from frame to frame, remaining ones of the objects being dynamic; and outputting, by the processor to a display device, those of the voxels corresponding to the dynamic objects and not to the static objects.

Example 2 includes the subject matter of Example 1, further including selecting, by the processor, only those of the voxels currently visible to a user of the display device, to produce a sparse subset of the voxels. The outputting of the voxels further includes only outputting those of the voxels belonging to the sparse subset.

Example 3 includes the subject matter of Example 2, further including filtering, by the processor, the sparse subset to remove those of the voxels corresponding to the static objects, to produce a dynamic subset of the sparse subset. The outputting of the voxels further includes only outputting those of the voxels belonging to the dynamic sparse subset.

Example 4 includes the subject matter of Example 3, further including mapping, by the processor, the static objects to their corresponding ones of the voxels.

Example 5 includes the subject matter of any of Examples 2 through 4, further including organizing the sparse subset in a sparse voxel octree (SVO) format.

Example 6 includes the subject matter of any of the preceding Examples, further including filtering, by the processor, the set of voxels to remove those of the voxels corresponding to the static objects, to produce a dynamic subset of the voxels. The outputting of the voxels further includes only outputting those of the voxels belonging to the dynamic sub set.

Example 7 includes the subject matter of Example 6, further including mapping, by the processor, the static objects to their corresponding ones of the voxels.

Example 8 includes the subject matter of Examples 1 through 7, further including: receiving, by the display device, the voxels corresponding to the dynamic objects; rendering, by the display device, the received voxels corresponding to the dynamic objects; and rendering, by the display device, voxels corresponding to the static objects received during earlier frames.

Example 9 is a system for three-dimensional (3D) reconstruction of a dynamic scene as a set of voxels. The system includes: a data capture circuit to receive image data from each of two or more spatially-separated sensors observing the scene from a corresponding two or more vantage points; an image processing circuit to fuse the image data into the set of voxels on a frame-by-frame basis; an object segmentation circuit to segment the image data into objects that constitute the scene; a motion detection circuit to detect which of the objects remain static from frame to frame, remaining ones of the objects being dynamic; and a voxel output circuit to output, to a display device, those of the voxels corresponding to the dynamic objects and not to the static objects.

Example 10 includes the subject matter of Example 9, further including a voxel selection circuit to select only those of the voxels currently visible to a user of the display device, to produce a sparse subset of the voxels. The voxel output circuit is further to only output those of the voxels belonging to the sparse subset.

Example 11 includes the subject matter of Example 10, further including a static filter circuit to filter the sparse subset to remove those of the voxels corresponding to the static objects, to produce a dynamic subset of the sparse subset. The voxel output circuit is further to only output those of the voxels belonging to the dynamic sparse subset.

Example 12 includes the subject matter of Example 11, further including a voxel mapping circuit to map the static objects to their corresponding ones of the voxels.

Example 13 includes the subject matter of any of Examples 10 through 12, the voxel selection circuit being further to organize the sparse subset in a sparse voxel octree (SVO) format.

Example 14 includes the subject matter of any of Examples 9 through 13, further including a static filter circuit to filter the set of voxels to remove those of the voxels corresponding to the static objects, to produce a dynamic subset of the voxels. The voxel output circuit is further to only output those of the voxels belonging to the dynamic subset.

Example 15 includes the subject matter of Example 14, further including a voxel mapping circuit to map the static objects to their corresponding ones of the voxels.

Example 16 includes the subject matter of any of Examples 9 through 15, the display device being to receive the voxels corresponding to the dynamic objects, render the received voxels corresponding to the dynamic objects, and render voxels corresponding to the static objects received during earlier frames.

Example 17 is at least one non-transitory computer readable storage medium having instructions encoded thereon that, when executed by one or more processors, result in the following operations for three-dimensional (3D) reconstruction of a dynamic scene as a set of voxels being performed. The operations include: receiving image data from each of two or more spatially-separated sensors observing the scene from a corresponding two or more vantage points; fusing the image data into the set of voxels on a frame-by-frame basis; segmenting the image data into objects that constitute the scene; detecting which of the objects remain static from frame to frame, remaining ones of the objects being dynamic; and outputting to a display device those of the voxels corresponding to the dynamic objects and not to the static objects.

Example 18 includes the subject matter of Example 17, the operations further including selecting only those of the voxels currently visible to a user of the display device, to produce a sparse subset of the voxels. The outputting of the voxels further includes only outputting those of the voxels belonging to the sparse subset.

Example 19 includes the subject matter of Example 18, the operations further including filtering the sparse subset to remove those of the voxels corresponding to the static objects, to produce a dynamic subset of the sparse subset. The outputting of the voxels further includes only outputting those of the voxels belonging to the dynamic sparse subset.

Example 20 includes the subject matter of Example 19, the operations further including mapping the static objects to their corresponding ones of the voxels.

Example 21 includes the subject matter of any of Examples 18 through 20, the operations further including organizing the sparse subset in a sparse voxel octree (SVO) format.

Example 22 includes the subject matter of any of Examples 17 through 21, the operations further including filtering the set of voxels to remove those of the voxels corresponding to the static objects, to produce a dynamic subset of the voxels. The outputting of the voxels further includes only outputting those of the voxels belonging to the dynamic sub set.

Example 23 includes the subject matter of Example 22, the operations further including mapping the static objects to their corresponding ones of the voxels.

Example 24 includes the subject matter of any of Example 17 through 23, the display device being to receive the voxels corresponding to the dynamic objects, render the received voxels corresponding to the dynamic objects, and render voxels corresponding to the static objects received during earlier frames.

Example 25 is a system for three-dimensional (3D) reconstruction of a dynamic scene as a set of voxels. The system includes: means for receiving image data from each of two or more spatially-separated sensors observing the scene from a corresponding two or more vantage points; means for fusing the image data into the set of voxels on a frame-by-frame basis; means for segmenting the image data into objects that constitute the scene; means for detecting which of the objects remain static from frame to frame, remaining ones of the objects being dynamic; and means for outputting to a display device those of the voxels corresponding to the dynamic objects and not to the static objects.

Example 26 includes the subject matter of Example 25, further including means for selecting only those of the voxels currently visible to a user of the display device, to produce a sparse subset of the voxels. The means for outputting of the voxels further includes means for only outputting those of the voxels belonging to the sparse subset.

Example 27 includes the subject matter of Example 26, further including means for filtering the sparse subset to remove those of the voxels corresponding to the static objects, to produce a dynamic subset of the sparse subset. The means for outputting of the voxels further includes means for only outputting those of the voxels belonging to the dynamic sparse sub set.

Example 28 includes the subject matter of Example 27, further including means for mapping the static objects to their corresponding ones of the voxels.

Example 29 includes the subject matter of any of Examples 26 through 28, further including means for organizing the sparse subset in a sparse voxel octree (SVO) format.

Example 30 includes the subject matter of any of Examples 25 through 29, further including means for filtering the set of voxels to remove those of the voxels corresponding to the static objects, to produce a dynamic subset of the voxels. The means for outputting of the voxels further includes means for only outputting those of the voxels belonging to the dynamic subset.

Example 31 includes the subject matter of Example 30, further including means for mapping the static objects to their corresponding ones of the voxels.

Example 32 includes the subject matter of any of Examples 25 through 31, the display device being to receive the voxels corresponding to the dynamic objects, render the received voxels corresponding to the dynamic objects, and render voxels corresponding to the static objects received during earlier frames.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood in light of the present disclosure. The present disclosure should therefore be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for three-dimensional (3D) reconstruction of a dynamic scene as a set of voxels, the method comprising:
   receiving, by a processor-based system, image data from each of two or more spatially-separated sensors observing the scene from a corresponding two or more vantage points;
   fusing, by the processor-based system, the image data into a first set of voxels on a frame-by-frame basis;
   segmenting, by the processor-based system, the image data into objects that constitute the scene;
   detecting, by the processor-based system, which of the objects remain static from frame to frame, remaining ones of the objects being dynamic;
   mapping the static objects to their corresponding voxels of the first set;
   removing the voxels corresponding to the static objects from the first set of voxels to form a second set of voxels different from the first set of voxels, the second set including only dynamic voxels; and
   outputting, by the processor-based system to a display device, the second set of voxels and not any voxels corresponding to the static objects from the first set.

2. The method of claim 1, further comprising selecting, by the processor-based system, only those of the voxels currently visible to a user of the display device, to produce a sparse subset of the voxels, wherein the outputting of the second set of voxels further comprises only outputting those of the second set of voxels belonging to the sparse subset.

3. The method of claim 2, further comprising organizing, by the processor-based system, the sparse subset in a sparse voxel octree (SVO) format.

4. The method of claim 1, wherein the display device is a 3D display device or an SVO ray cast display device.

5. The method of claim 1, wherein the segmenting comprises segmenting the image data into objects using machine learning algorithms.

6. The method of claim 1, wherein the receiving comprises receiving image data from each of three or more equidistantly separated sensors.

7. A system for three-dimensional (3D) reconstruction of a dynamic scene as a set of voxels, the system comprising:
   a data capture circuit configured to receive image data from each of two or more spatially-separated sensors observing the scene from a corresponding two or more vantage points;
   an image processing circuit configured to fuse the image data into a first set of voxels on a frame-by-frame basis;
   an object segmentation circuit configured to segment the image data into objects that constitute the scene;
   a motion detection circuit configured to detect which of the objects remain static from frame to frame, remaining ones of the objects being dynamic;
   a voxel mapping circuit configured to map the static objects to their corresponding ones of the voxels of the first set;
   a static filter circuit configured to remove the voxels corresponding to the static objects from the first set of voxels to produce a second set of voxels different from the first set of voxels, the second set including only dynamic voxels; and
   a voxel output circuit configured to output, to a display device, the second set of voxels and not any voxels corresponding to the static objects from the first set.

8. The system of claim 7, further comprising a voxel selection circuit configured to select only those of the voxels currently visible to a user of the display device, to produce a sparse subset of the voxels, wherein the voxel output circuit is further to only output those of the second set of voxels belonging to the sparse subset.

9. The system of claim 8, wherein the voxel selection circuit is further configured to organize the sparse subset in a sparse voxel octree (SVO) format.

10. The system of claim 8, wherein the display device is a 3D display device or an SVO ray cast display device.

11. The system of claim 8, wherein the object segmentation circuit is configured to segment the image data into objects using machine learning algorithms.

12. The system of claim 8, wherein the two or more spatially-separated sensors comprise three or more equidistantly separated sensors.

13. At least one non-transitory computer readable storage medium having instructions encoded thereon that, when executed by one or more processors, result in the following operations for three-dimensional (3D) reconstruction of a dynamic scene as a set of voxels being performed, the operations comprising:
   receiving image data from each of two or more spatially-separated sensors observing the scene from a corresponding two or more vantage points;
   fusing the image data into a first set of voxels on a frame-by-frame basis;
   segmenting the image data into objects that constitute the scene;
   detecting which of the objects remain static from frame to frame, remaining ones of the objects being dynamic;
   mapping the static objects to their corresponding voxels of the first set;

removing the voxels corresponding to the static objects from the first set of voxels to form a second set of voxels different from the first set of voxels, the second set including only dynamic voxels; and outputting to a display device the second set of voxels and not any voxels corresponding to the static objects from the first set.

14. The computer readable storage medium of claim 13, the operations further comprising selecting only those of the voxels currently visible to a user of the display device, to produce a sparse subset of the voxels, wherein the outputting of the second set of voxels further comprises only outputting those of the second set of voxels belonging to the sparse subset.

15. The computer readable storage medium of claim 14, the operations further comprising organizing the sparse subset in a sparse voxel octree (SVO) format.

16. The computer readable storage medium of claim 13, wherein the display device is a 3D display device or an SVO ray cast display device.

17. The computer readable storage medium of claim 13, wherein the segmenting comprises segmenting the image data into objects using machine learning algorithms.

18. The computer readable storage medium of claim 13, wherein the receiving comprises receiving image data from each of three or more equidistantly separated sensors.

* * * * *